E. W. MIKAELSON.
SHAFT COUPLING.
APPLICATION FILED JAN. 7, 1920.
1,372,444.
Patented Mar. 22, 1921.
2 SHEETS—SHEET 1.
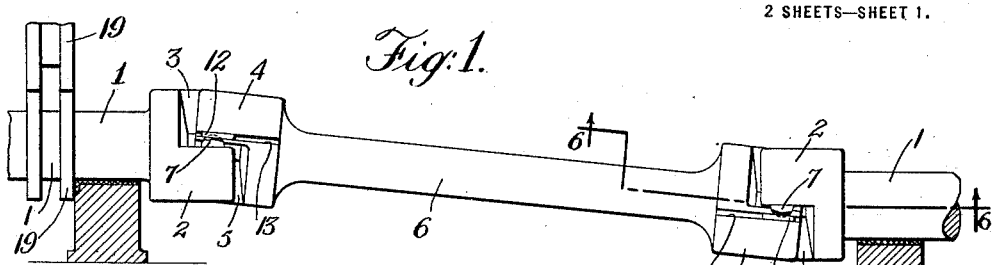
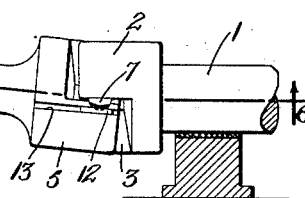
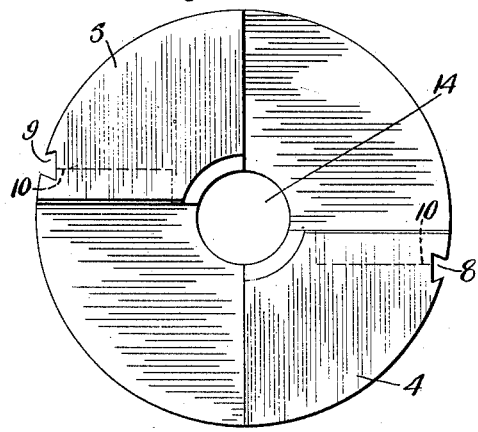
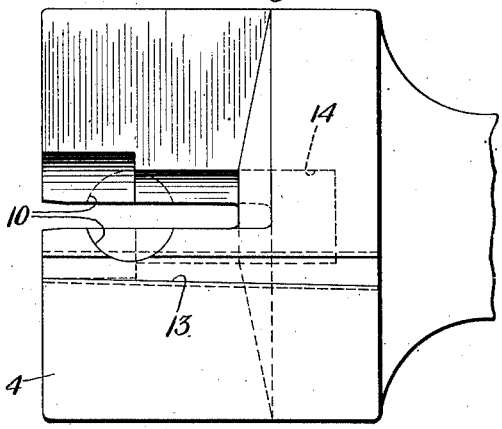
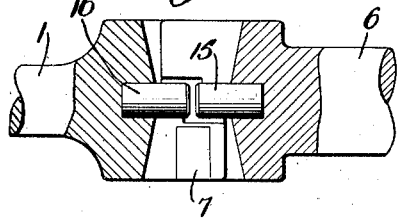
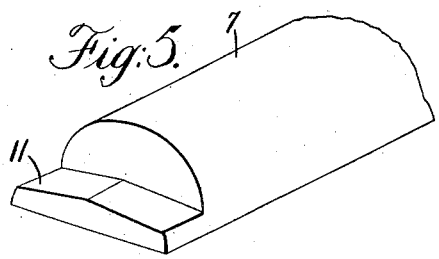
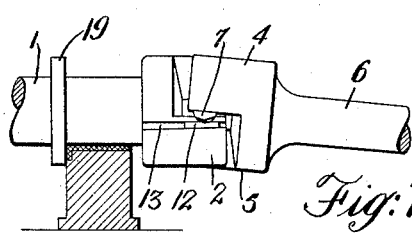
Inventor
Erik W. Mikaelson,
By his Attorney

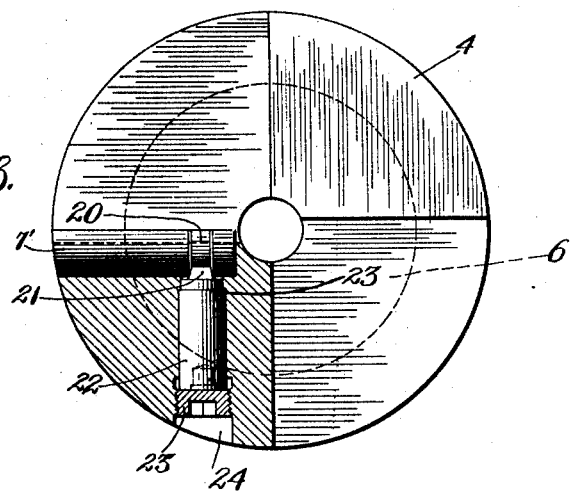
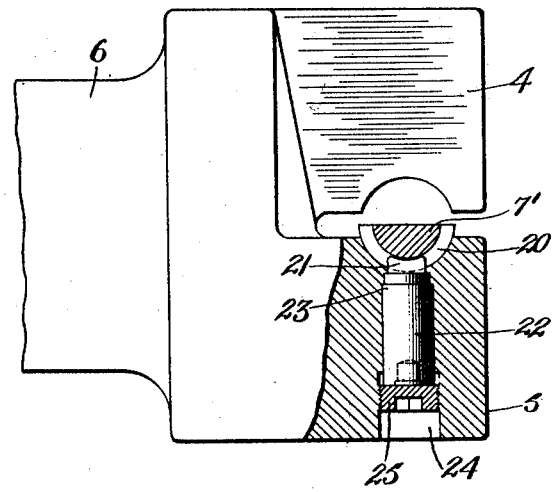

UNITED STATES PATENT OFFICE.

ERIK W. MIKAELSON, OF EASTON, PENNSYLVANIA, ASSIGNOR TO TREADWELL ENGINEERING COMPANY, A CORPORATION OF PENNSYLVANIA.

SHAFT-COUPLING.

1,372,444.  Specification of Letters Patent.  Patented Mar. 22, 1921.

Application filed January 7, 1920. Serial No. 349,938.

*To all whom it may concern:*

Be it known that I, ERIK MIKAELSON, a citizen of the United States, and resident of Easton, in the county of Northampton and State of Pennsylvania, have invented certain new and useful Improvements in Shaft-Couplings, of which the following is a specification.

This invention relates to improvements in shaft couplings for use in rolling mills.

In the form of universal coupling provided with two oppositely located jaws, such as the one shown in the patent to Julian Kennedy, Number 666,144, granted January 15, 1901, the bearing pressure is upon a bearing shoe or brass of semi-cylindrical form. The bearing shoes being of comparatively small area and the forces being of considerable magnitude the bearing shoes wear rapidly. In this type of coupling, in order to replace a bearing shoe, it is necessary to take the coupling apart and then reassemble, after the bearing shoes are inserted. There is no clearance between the bearing shoes and the face of the jaws so that, if the shoes must be first inserted, it is difficult to fit the jaws together, particularly as the spindle is heavy and the rolls weigh several tons. Unless the spindle and shafts are in alinement the end thrust will not be distributed throughout the coupling but will be localized in the jaws of the coupling. Such localization is undesirable as the jaws may break if the end thrust is not distributed. The diameter of the jaws cannot be increased to avoid this difficulty as they are limited by the diameter of the rolls.

One of the objects of this invention is the construction of an interfitting jaw coupling having bearing shoes that can be inserted and locked in place after the coupling is assembled.

Another object of this invention is to prevent the localization of end thrusts in the jaws.

Other objects of the invention will appear more fully hereinafter.

Referring to the drawings:

Figure 1, is an assembled view of a coupling embodying the principles of my invention and showing a fragmentary portion of the upper and lower rolls. Fig. 2, is an end view of the enlarged coupling portion of the spindle showing in dotted lines the position of the bearing shoe. Fig. 3, is a side view of the enlarged coupling portion of the spindle. Fig. 4, is a detail view of the tapered key. Fig. 5, is a detail view of the bearing shoe. Fig. 6, is a sectional view along the line 6, 6, Fig. 1, showing the location and relative arrangement of the thrust pins. Fig. 7, is a modified form showing the bearing shoes in the jaws of the end of the shaft. Fig. 8, is an end view of a modified form of bearing shoe retaining means. Fig. 9, is a side elevation partly in section of the end of a coupling showing the modified form of bearing shoe retaining means.

The roll or pinion shafts 1, have enlarged ends provided with oppositely located projecting jaws 2, 3, of segmental shape with their side faces on radial planes extending through the axis of the spindle. Meshing with the jaws 2, 3 are similar jaws 4, 5 on the enlarged coupling ends of the spindle 6. On the driven face of each jaw of the coupling end of the spindle 6 and on the driving face of each jaw of the other end of the spindle 6 is a recess 10 of a semi-cylindrical form for a bearing shoe 7 likewise of a semi-cylindrical form to fit in recess 10 with the flat side of the shoe projecting to form a bearing surface upon the radial face. The rocking of bearing shoes 7 permits the coupling, within limits, to operate as a universal joint.

Upon the outside cylindrical surface of the jaws 4, 5, keyways 13 are cut in close proximity to the radial face to overlap the end of the recess 10. Bearing shoe 7 is partly cut away at one end with a projecting piece 11 beveled to permit the shoe 7 to rock after key 12 is driven in its keyway 13 to lock the bearing shoe 7 in place.

In each end of spindle 6 in line with the axis of the spindle are counterbored holes 14. Thrust pins 15 fit in holes 14. And similarly, the ends of shafts 1 have thrust pins 16 fitted in corresponding holes in line with the axis of the shafts 1. The holes 14 are enlarged at their junction ends to permit assembly and operation if the shafts 1, 1 and spindle 6 are not in alinement. If the rolls are reversibly driven the four faces of the jaws at each end of the spindle 6 would be provided with the recesses, bearing shoes and retaining means.

In the modified form shown in Fig. 7 the enlarged end of the shafts 1 have the bearing shoes inserted in recesses in the faces of the jaws 2 and 3 instead of in the spindle ends.

In Figs. 8 and 9 the bearing shoe 7' has a groove 20. The end 21 of a plug 22 is shaped to fit in the groove 20 and to prevent the withdrawal or shifting of the bearing shoe 7'. Plug 22 has a shoulder 23 to limit the depth of insertion. Plug 22 is inserted from the outside of the cylindrical surface of the jaw. The counterbored hole 24 in which the plug 22 fits is tapped at its outer end and a screw plug 25 is screwed down against plug 22 to hold it in place.

When rolls are changed it is difficult to place the shafts in their bearings and to slip the jaws of the coupling into the jaws of the shaft if the bearing shoes must be inserted first, since there is no clearance between the face of the bearing shoe and the coöperating jaw face and the rolls and coupling are of great weight. By this invention the change can be readily made as the bearing shoes are inserted after the roll is in place and the jaws of the shaft and coupling, due to the clearance that would have been taken up by the projection of the bearing shoe, can be easily interlocked. The bearing shoes can then be inserted and held in place by any suitable form of retaining means such as by a key or plug.

This invention is not limited in its use to form a universally movable joint between the spindles and the rolls and roll driving pinions of rolling mills having a vertically movable top roll as it can be used whenever a strong flexible coupling having bearing shoes is desired.

What I claim is:

1. In a universal coupling having interfitting pairs of jaws, a semi-cylindrical recess in the face of each of the jaws, an exteriorly removable bearing shoe for said recess and having a projecting flat face adapted to bear against the face of the coöperating jaws, the said bearing shoe being partly cut away with the uncut portion wedge shape, a keyway in the exterior surface of each of the jaws and a key for said keyway covering the cut away part of the shoe to lock the shoe in position.

2. In a universal coupling having interfitting jaws, semi-cylindrical recesses in the faces of said jaws, exteriorly removable semi-cylindrical bearing shoes for said recesses, a groove in the cylindrical surface of each bearing shoe, a plug adapted to fit in said groove, and retaining means for said plug.

3. In a universal coupling having interfitting jaws, semi-cylindrical recesses in the faces of said jaws, a semi-cylindrical bearing having a groove in the cylindrical surface for each recess, a locking plug adapted to fit in the groove and a screw plug to hold the locking plug in position.

4. In a universal coupling having interfitting pairs of jaws, semi-cylindrical recesses in the faces of one pair of jaws, exteriorly removable bearing shoes for said recesses and having flat faces adapted to bear against the faces of the coöperating jaws, each of said bearing shoes being partly cut away at its outer end, a longitudinal keyway in the exterior surface of each of said jaws intercepting the bearing shoe recesses respectively, and a key for said keyway covering the cut away part of the shoe to lock the shoe in position.

Signed at Easton, in the county of Northampton and State of Pennsylvania, this 29th day of December, A. D. 1919.

ERIK W. MIKAELSON.